Patented Nov. 11, 1947

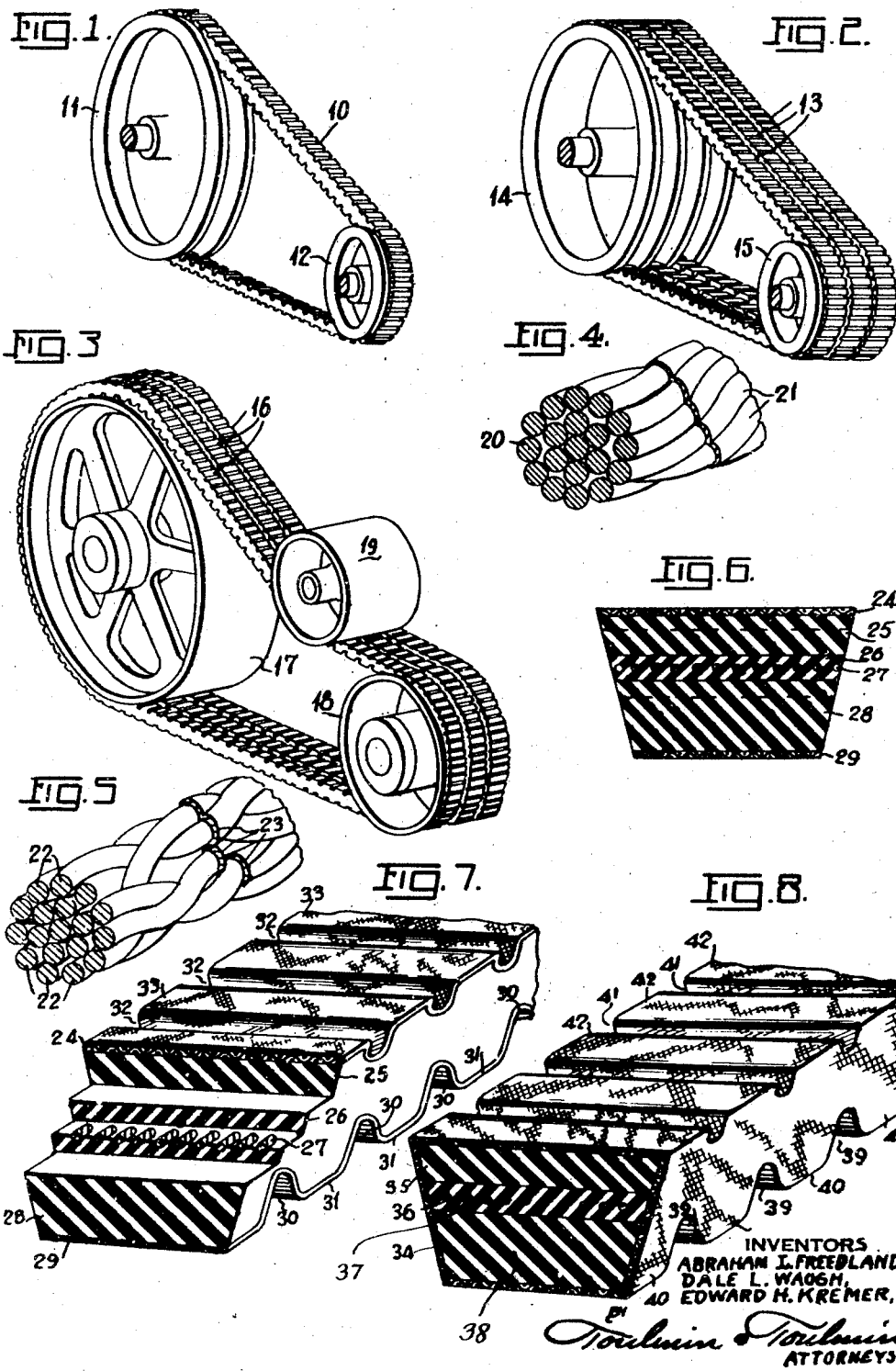

2,430,500

UNITED STATES PATENT OFFICE 2,430,500

WIRE REINFORCED DOUBLE COG BELT

Abraham L. Freedlander, Dale L. Waugh, and Edward H. Kremer, Dayton, Ohio, assignors to The Dayton Rubber Company, a corporation of Ohio Application April 12, 1943, Serial No. 482,702

7 Claims. (Cl. 74—233)

This invention relates to wire reinforced belts, and more particularly deals with double cog belts having a neutral axis section comprising fine metal wires.

In the past it has been common practice to manufacture V-belts with reinforcing cords of porous and absorbent textile material such as cotton and the like in the neutral axis section. The purpose of the cord is to provide strength and to make the belt substantially inextensible so that it will stretch or elongate the least possible in use.

More recently, cables formed of twisted or braided wire of approximately 0.005" diameter have been used in place of textile cord. The use of these wire cables results in a belt structure which has a far greater service life and will stretch far less in service than is the case with similar belts made with textile cords. However, since the wire is neither porous nor absorbent, as is the textile cord, it will not absorb or become impregnated or permeated with rubber composition as is the case with textile cord, and since the wire lacks these characteristics, it does not adhere to the rubber composition of which the body of the belt is made as firmly or tenaciously as the textile cord. However, since the use of wire offers many advantages and results in a belt which is far stronger and of greater service life and efficiency, it has appeared advantageous to devise ways and means whereby the adhesion of the rubber and the wire may be increased substantially so as to insure a firm bond between them.

According to the present invention, wire of approximately 0.005" diameter is formed into a cable of any desired diameter by twisting or by braiding and is then subjected to electro treatment for the purpose of depositing on the surface thereof a coating or plate of copper. This copper plated wire may then be used in place of the textile cord generally employed in the manufacture of V-belts and a substantial degree of adhesion will take place between the plated wire and the rubber composition of which the body of the belt is made. The factors involved in this phenomenon are not fully known or clearly understood; however, it is believed that the freshly deposited copper on the surface of the wire cable reacts chemically with sulfur or sulfur compounds in the rubber composition and thereby a firm bond results between the rubber and the metal.

This explanation is expressed purely as a theory and is not to be considered or construed as a limitation. It appears to be reasonable because unless the plated wire is used soon after the plate has been deposited, passivation of the plate takes place and the adhesion between the metal and the rubber composition gradually decreases and ultimately becomes negligible.

The nature of the present invention will be fully understood from the following description taken in connection with the annexed drawing, in which:

Fig. 1 illustrates the manner in which the belt of the present invention may be employed in a single belt V-to-V drive;

Fig. 2 illustrates the manner in which the belt of the present invention may be employed in a multi-belt V-to-V drive;

Fig. 3 illustrates the manner in which the belt of the present invention may be used in a V-to-flat drive;

Fig. 4 is a perspective view, partly in cross section, of a cable consisting of a plurality of twisted strands of fine wire having a plated metal on its outer surface;

Fig. 5 is a perspective view, partly in cross section, of a cable consisting of a plurality of braided strands of wire having a plate or metal on its outer surface;

Fig. 6 is a cross sectional view of the belt of the present invention taken at a point of greatest depth or height;

Fig. 7 is a perspective view, partly broken away, of a portion of the belt of the present invention; and Fig. 8 is a perspective view, partly in cross section, of a portion of the belt of the present invention illustrating the relative position of the tension, neutral axis and compression sections thereof.

Referring to the drawing in detail, in Fig. 1 the numeral 10 represents the belt of the present invention running over V-pulleys 11 and 12; in Fig. 2, 13 represents a plurality of belts of the present invention running over V-pulleys 14 and 15; and in Fig. 3, 16 represents a plurality of belts of the present invention running over flat pulley 17 and V-pulleys 18 with an idler 19 in association therewith.

In Fig. 4 the numeral 20 represents the individual strands of fine wire twisted to form a cable and 21 represents the metal plate deposited thereover; and in Fig. 5 the numeral 22 represents the strands of fine wire which are braided to form a cable and 23 represents the metal plate covering the outer surface of said cable as a unit.

In Figs. 6 and 7 the numeral 24 represents the strip of rubberized fabric on the outer or top surface of the belt, 25 represents the tension section, 26 represents the neutral axis section including a plurality of cords 27, 28 represents the compression section, and 29 represents the layer of rubberized fabric on the bottom or inner surface of the belt. Furthermore, in Fig. 7 the numeral 30 denotes the grooves transverse of the longitudinal axis of the belt on the bottom or inner surface thereof and the numeral 31 denotes the cogs formed along the inner or underside of the belt by the grooves 30. The numeral 32 represents the grooves transverse of the longitudinal axis of the belt along the outer or upper surface thereof and the numeral 33 denotes the cogs formed by said grooves 32.

In Fig. 8 the numeral 34 denotes the wrapper which surrounds the body of the belt, 35 represents the tension section, 36 represents the neutral axis section including a plurality of cords 37, 38 represents the compression section, 39 represents the grooves transverse of the longitudinal axis of the belt along the bottom or inner surface thereof, 40 represents the cogs formed by the grooves 39, 41 represents the grooves transverse of the longitudinal axis of the belt on the top or outer side thereof, and 42 represents the cogs formed by the grooves 41.

The belt of the present invention, while of the V-type, nevertheless may be used for V-to-flat drives just as well as for V-to-V drives. The cogs and grooves on its top and under sides or surfaces give it extraordinary flexibility and make it possible to run the belt at high speeds without overheating it. Overheating is due primarily to internal stresses generated in the belt as it passes at high lineal velocities over pulleys of small diameter and such overheating proves highly detrimental and causes a substantial reduction in the service life of the belt. Therefore, because of the extraordinary flexibility of the belt of the present invention due to its cog surface, it is a cool running belt and one characterized by long service life under difficult conditions.

In Figs. 6, 7 and 8 the tension and compression sections are illustrated as being made of rubber composition. In many instances it is advantageous to have the compression section made of rubber composition reinforced with fine textile fibers which lie parallel to each other, such fiber reinforced rubber composition being known generally by the trade name "Stiflex." When "Stiflex" is used in the compression section it is advantageous to have the fibers transverse of the longitudinal axis of the belt since this serves to decrease the lateral compressibility of the belt and gives it greater lateral stability without adversely affecting the flexibility or bendability of the belt. "Stiflex" may be used with equal satisfaction in the tension section of the belt, or a plurality of layers of rubberized fabric may be used therein if so desired or required by the service for which the belt is intended.

While we have described herein and illustrated in the drawing a cable comprising a plurality of fine wires having a plate thereover, it will be understood that a cable comprising a plurality of plated wires may be substituted therefor and satisfactory results obtained, and that while we have specified a wire approximately 0.005" in diameter, we do not intend to limit ourselves to the use of wire of such diameter, since wire of greater or lesser diameter may be used depending on the size of the cable to be used. The size of the cable, in turn, will depend on the type of belt and the nature of the service for which it is intended.

It will be understood by those skilled in the art that while we have described herein and illustrated in the annexed drawing certain preferred embodiments of our invention, we do not intend thereby to have our invention limited to or circumscribed by the particular details of construction, arrangement of parts, procedures, or products herein described or illustrated in the drawing in view of the fact that this invention is susceptible to changes depending on individual preference and conditions without necessarily departing from the spirit of this disclosure and the scope of the appended claims.

We claim:

1. A belt having a plurality of cords in its neutral axis, each of said cords forming a cable having an outside plated surface, said cable comprising a plurality of twisted wires, said cable being plated as a unit after having been formed.

2. A belt having a plurality of cords in its neutral axis, each of said cords forming a cable having an outside plated surface, said cable comprising a plurality of twisted wires, said cable being plated as a unit after having been formed, said belt having substantially flat top and bottom surfaces and a fabric covering for said surfaces.

3. A belt having a plurality of cords in its neutral axis, each of said cords forming a cable having an outside plated surface, said cable comprising a plurality of twisted wires, said cable being plated as a unit after having been formed, said belt being of V-type.

4. A belt having a plurality of cords in its neutral axis, each of said cords forming a cable having an outside plated surface, said cable comprising a plurality of twisted wires, said cable being plated as a unit after having been formed, said belt being of V-type, said belt having top and bottom surfaces and a plurality of cogs in at least one of said surfaces.

5. A belt having a plurality of cords in its neutral axis, each of said cords forming a cable having an outside plated surface, said cable comprising a plurality of twisted wires, said cable being plated as a unit after having been formed, said belt being of V-type and having a fabric covering.

6. A belt having a plurality of cords in its neutral axis, each of said cords forming a cable having an outside plated surface, said cable comprising a plurality of twisted wires, said cable being plated as a unit after having been formed, said belt being of V-type, said belt having top and bottom surfaces and a plurality of cogs on each of said top and bottom surfaces.

7. A belt having a plurality of cords in its neutral axis, each of said cords forming a cable having an outside plated surface, said cable comprising a plurality of twisted wires, said cable being plated as a unit after having been formed, said belt being of V-type and having a fabric covering and presenting top and bottom surfaces and cogs formed on each of said top and bottom surfaces.

ABRAHAM L. FREEDLANDER.
DALE L. WAUGH.
EDWARD H. KREMER.

REFERENCES CITED

The following references are of record in the file of this patent:

UNITED STATES PATENTS

| Number | Name | Date |
|---|---|---|
| 2,257,648 | Pierce | Sept. 30, 1941 |
| 2,326,719 | Myers | Aug. 10, 1943 |
| 2,114,517 | Apel et al. | Apr. 19, 1938 |
| 2,298,867 | Case | Oct. 13, 1942 |
| 1,890,080 | Freedlander | Dec. 6, 1932 |
| 556,663 | Dennison | Mar. 17, 1896 |
| 2,002,263 | Domm | May 21, 1935 |
| 198,860 | Starck | Jan. 1, 1878 |
| 2,028,165 | Pierce | Jan. 21, 1936 |
| 982,073 | Laird | Jan. 17, 1911 |
| 1,923,542 | Keyes et al. | Aug. 22, 1933 |

FOREIGN PATENTS

| Number | Country | Date |
|---|---|---|
| 223,318 | Great Britain | Oct. 21, 1924 |